(12) United States Patent
Lynn

(10) Patent No.: US 7,677,285 B2
(45) Date of Patent: Mar. 16, 2010

(54) TIRE CHAIN TIGHTENING APPARATUS

(76) Inventor: Anthony Lynn, c/o Mission, 435 University Ave. East, St. Paul, MN (US) 55101

( * ) Notice: Subject to any disclaimer, the term of this patent is extended or adjusted under 35 U.S.C. 154(b) by 14 days.

(21) Appl. No.: 11/340,894

(22) Filed: Jan. 26, 2006

(65) Prior Publication Data

US 2007/0169866 A1    Jul. 26, 2007

(51) Int. Cl.
*B60C 27/10* (2006.01)
(52) U.S. Cl. ...................... 152/218; 152/217
(58) Field of Classification Search ............... 152/217, 152/218, 219
See application file for complete search history.

(56) References Cited

U.S. PATENT DOCUMENTS

| | | | | |
|---|---|---|---|---|
| 2,729,261 A * | 1/1956 | Rucker | ............. | 152/218 |
| 3,016,079 A * | 1/1962 | Weller | ............. | 152/218 |
| 4,376,457 A * | 3/1983 | Guenther | ............. | 152/213 R |
| 4,862,936 A * | 9/1989 | McDonough | ............. | 152/216 |
| 5,513,684 A * | 5/1996 | Laub | ............. | 152/216 |
| 6,619,353 B1 * | 9/2003 | Kim | ............. | 152/225 R |
| 6,915,825 B1 * | 7/2005 | Stevenson, Jr. | ............. | 152/218 |
| 7,036,542 B2 * | 5/2006 | Kaiser et al. | ............. | 152/218 |
| 2002/0117245 A1 * | 8/2002 | Martinez | ............. | 152/218 |

* cited by examiner

*Primary Examiner*—Russell D Stormer
(74) *Attorney, Agent, or Firm*—Briggs and Morgan, P.A.

(57) ABSTRACT

The present invention relates to an apparatus used for tightening tire chains. One embodiment of the present invention includes an outer portion and an inner portion. The outer and inner portions have a plurality of first and second apertures, respectively. A plurality of arms are secured onto the inner portion and extend through the second aperture and then through the first apertures. The arms have a first end which is adapted to be secured onto the inner portion, and a second end which is adapted to secure to a tire chain. A bar variably couples the outer portion and the inner portion. The distance between the outer and inner portions adds or subtracts tension in the arm which correspondingly adds or subtracts tension in the tire chain.

16 Claims, 4 Drawing Sheets

TIRE CHAIN TIGHTENING APPARATUS

FIELD OF THE INVENTION

The present invention relates generally to tire chains. More specifically, the present invention relates to a tightening apparatus for a tire chain.

BACKGROUND OF THE INVENTION

Tire chains are often wrapped around a tire to provide added traction for snow-laden roads or for off-road driving. They are used by a number of different vehicles such as passenger cars, trucks, ATVs (all terrain vehicles), tractors and motorcycles. These chains are typically comprised of chain links or wire cable arranged in two generally parallel portions with crossing portions which connect to both parallel chain portions. One common configuration for a tire chain has two parallel portions and a plurality of crossing portions which are generally perpendicular to each parallel chain portion. Once attached to a tire, the crossing chain portion runs generally across the treads of a tire and provides added traction.

Generally, a tire chain is applied circumferentially around a tire, with opposite ends of the tire chain being connected to each other to complete a loop. A drawback of conventional tire chains is that they are often difficult to apply, especially if the tire chain fits snugly around a tire. However, a loose fitting tire chain is often less effective. Furthermore, tire sizes often vary and one set of tire chains may not be suitable for certain tire sizes. There is a benefit to using a larger tire chain and then tightening the tire chain to fit snugly around a tire.

There are tire chain tightening mechanisms which are known in the art. Many of these simply connect the end portions of the tire chains. These devices typically just extend between end portions of the tire chain. However, depending upon the fit of the tire chains around the tire, these devices may also be very difficult to apply. Furthermore, these devices have a very limited adjustment range. Consequently, there is a need for a tire chain tightening apparatus that is easier to install on a tire, and that has a greater range of adjustment.

SUMMARY OF THE INVENTION

The present invention relates to an apparatus used for tightening tire chains. One embodiment of the present invention includes an outer portion and an inner portion. The outer portion has a plurality of first apertures and the inner portion has a plurality of second apertures; a plurality of arms are secured onto the inner portion and extend through corresponding second apertures and then through corresponding first apertures. The arms have a first end which is adapted to be secured onto the inner portion, and a second end which is adapted to secure to a tire chain.

In one embodiment, the inner portion includes an inner surface wherein a plurality of clamping mechanisms are located. Each clamping mechanism is generally located adjacent to a second aperture. The clamping mechanisms enable the length of the arm to be adjusted relative to the dimension of the tire.

In one embodiment, a bar/rod couples the outer portion and the inner portion. The distance between the outer and inner portions adds or subtracts tension in the arm. The greater the distance in between the outer and inner portions the greater the tension in the arm. The bar provides a means for increasing or decreasing this distance.

In one embodiment, the outer portion is configured to remain in place relative to the bar and the inner portion moves relative to the outer portion. A threaded connection between the inner portion and the bar enables the inner portion to travel axially outward and axially inward along the bar depending upon the rotational direction of the bar. A handle is provided at the proximal end of the bar in order to enable the user to rotate the bar. A stop is also attached to the distal end of the bar in order to locate the present invention on the tire.

In one embodiment, the present invention is positioned in the center of the tire and the arms are attached to the tire chain. Gross adjustment of the arm length can be achieved by releasing the arm from the clamping mechanism located on the inner portion and increasing or decreasing the length of the arm. Tightening or loosening of tension in the arms is achieved by rotating the handle, which causes the inner portion to travel axially outward or axially inward along the bar depending upon the rotational direction. An increase in the distance between the outer and inner portion increases tension in the arms which pulls the tire chain thus causing greater tension in the tire chain.

BRIEF DESCRIPTION OF THE DRAWINGS AND FIGURES

For purposes of facilitating and understanding the subject matter sought to be protected, there is illustrated in the accompanying drawings an embodiment thereof. From an inspection of the drawings, when considered in connection with the following description, the subject matter sought to be protected, its construction and operation, and many of its advantages should be readily understood and appreciated.

DETAILED DESCRIPTION

The present invention relates to an apparatus used for tightening tire chains which are attached to a tire. The present invention is depicted being configured for use with automobile tire chains. However, the present invention can be easily adapted for use with a variety of different tire chain sizes and can be used on a variety of different wheeled vehicles. In addition, the present invention can be adapted to be a stand-alone device or can be integral to the tire chain.

Figure 1:
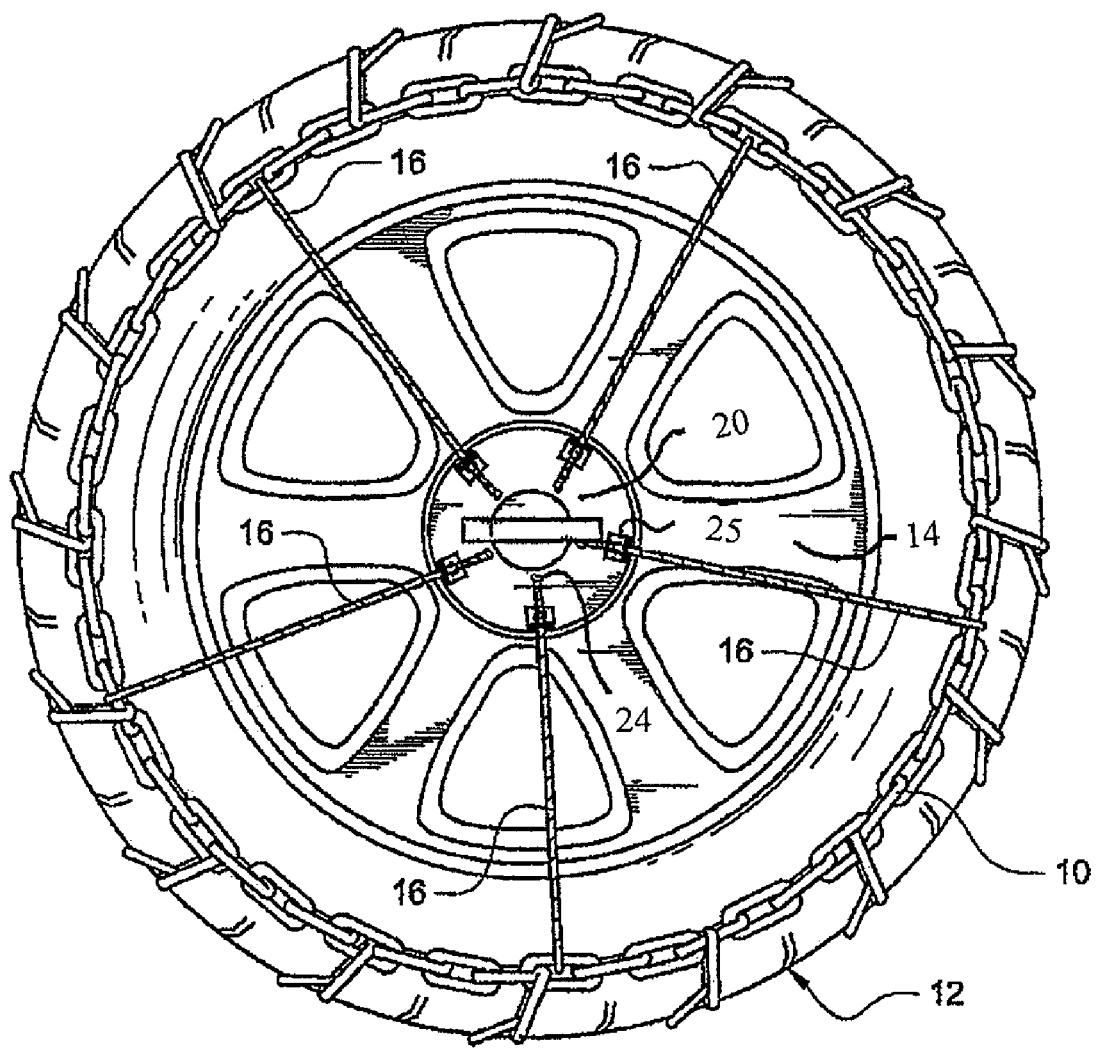
FIG. 1 is a top view of one embodiment of the subject invention coupled to a tire.

As shown in FIG. 1, one embodiment of the present invention is depicted attached to a tire chain 10 which is coupled to an automobile tire 12. The present invention is positioned over a hub cap 14 and is coupled to the tire chain via a plurality of arms 16. The arms 16 are arranged to couple circumferentially around the tire chain.

Figure 2:
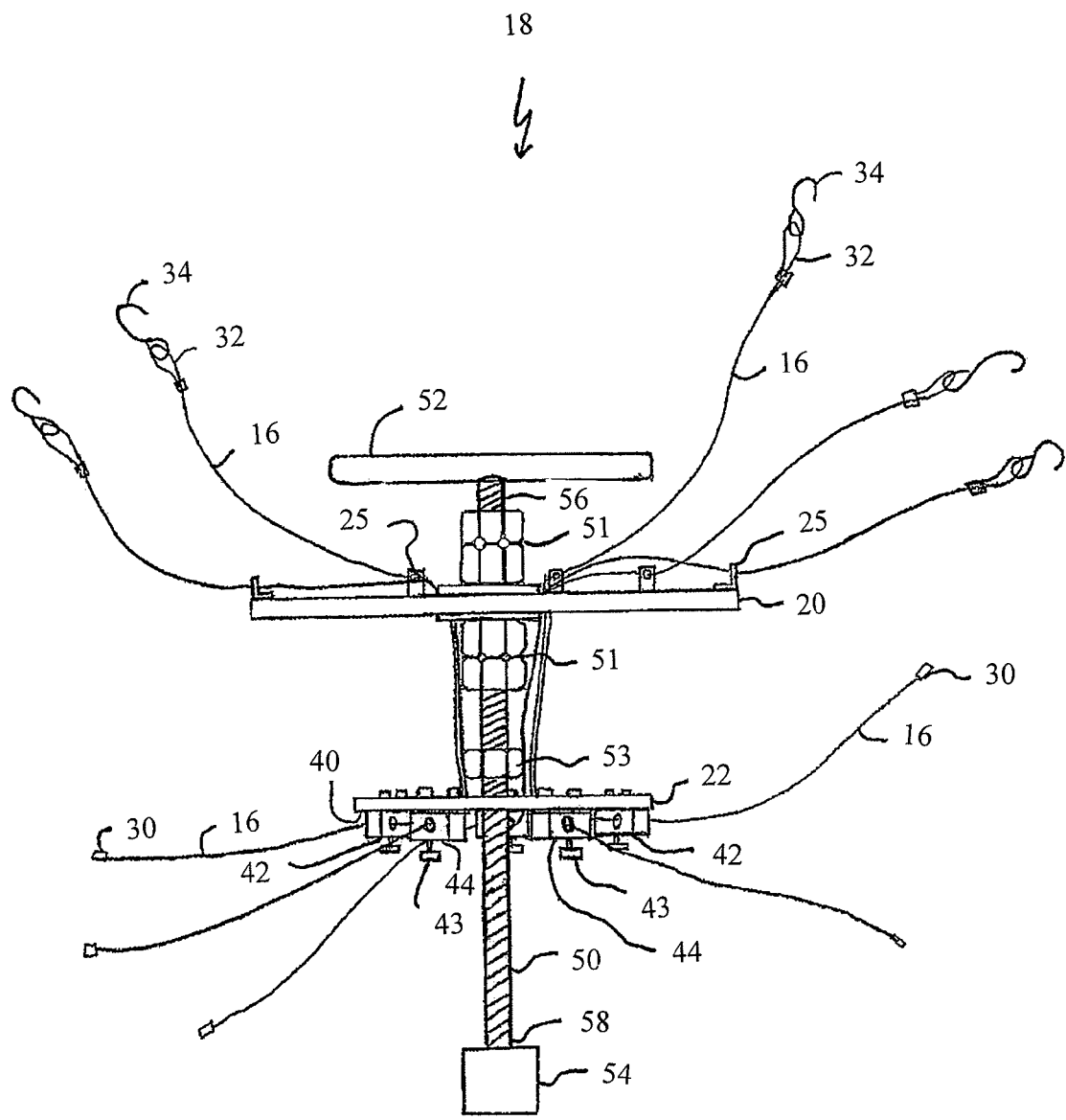
FIG. 2 is a side view of one embodiment of the subject invention.
Figure 3:
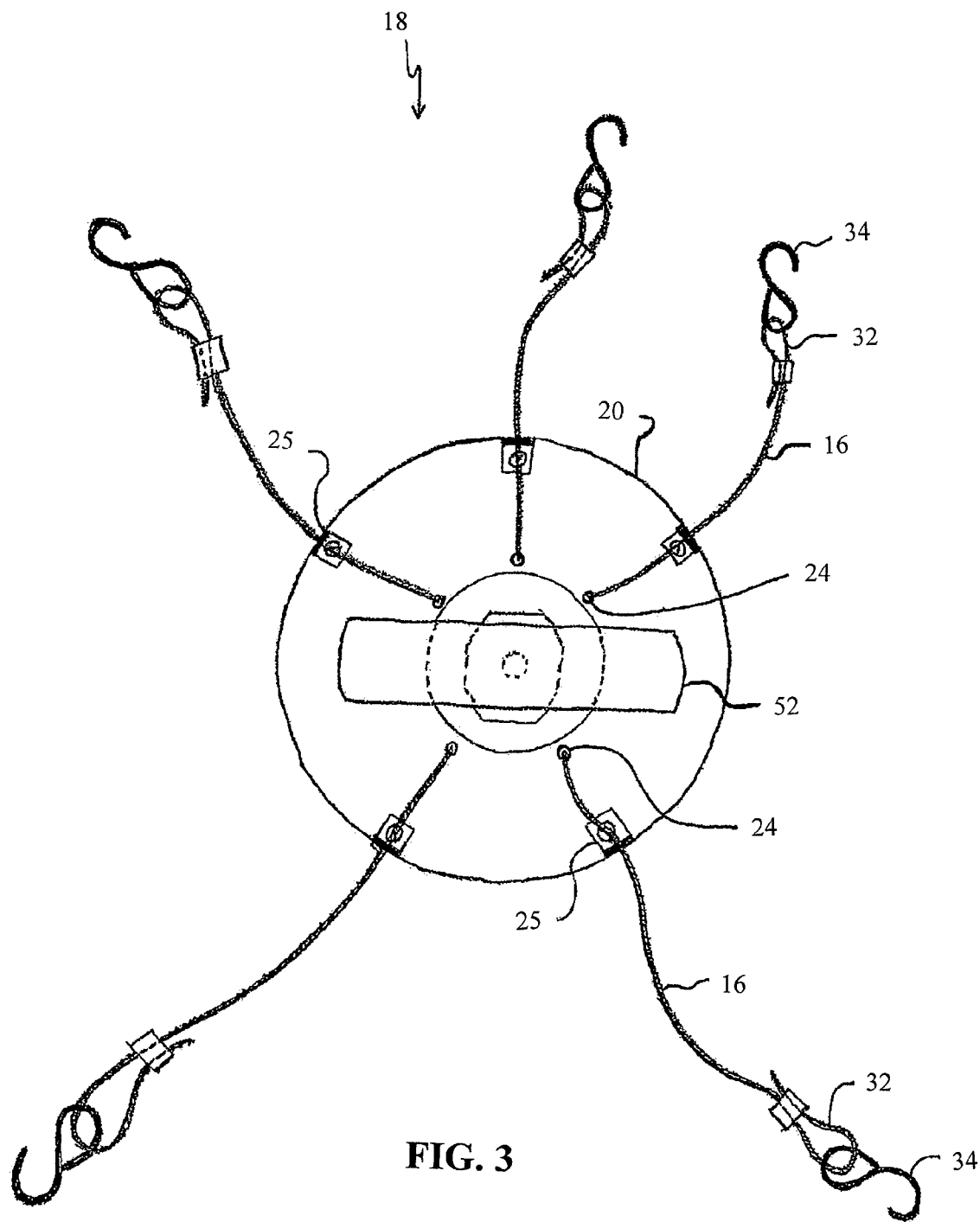
FIG. 3 is a top view of the embodiment of FIG. 2.
Figure 4:
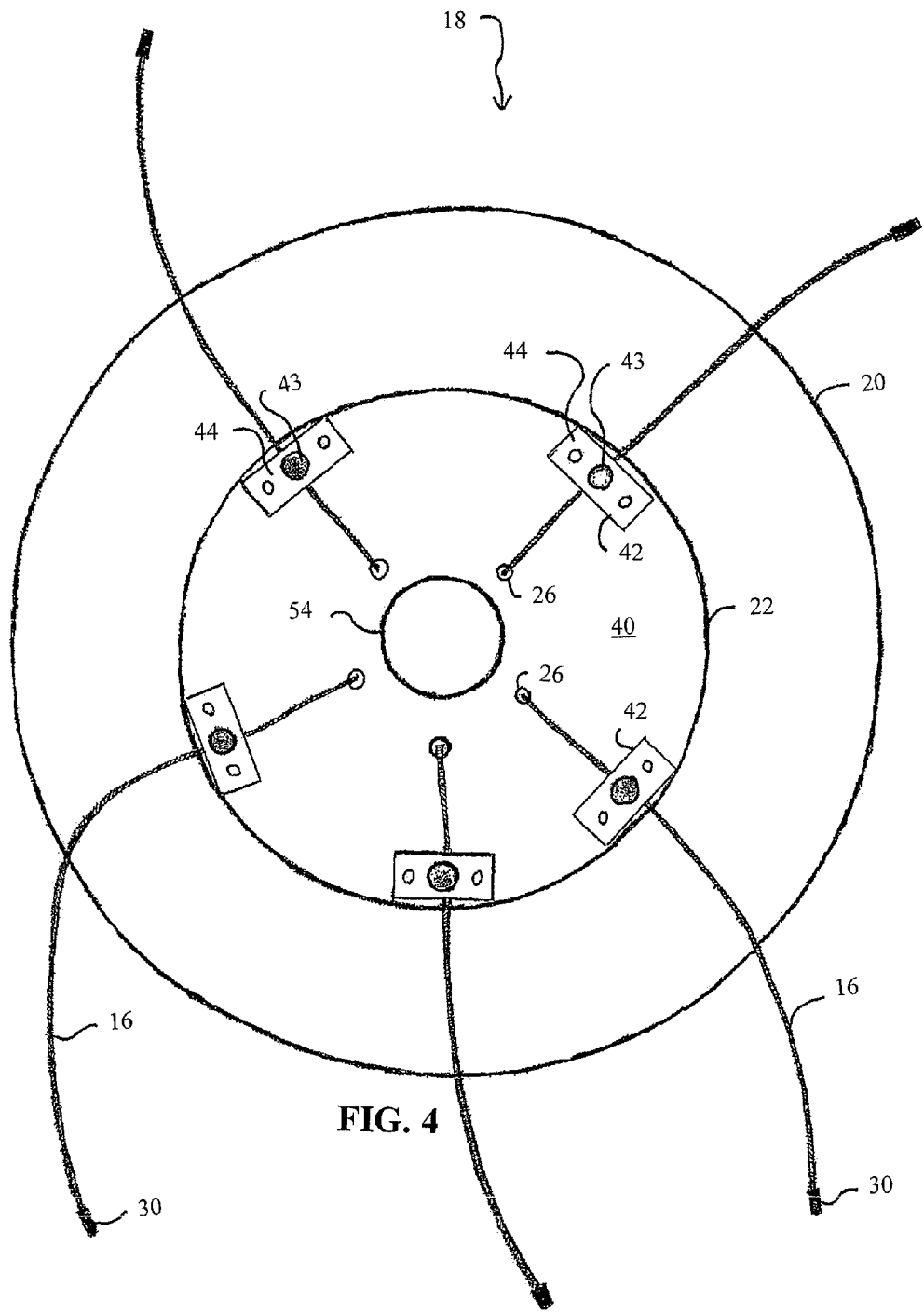
FIG. 4 is a bottom view of the embodiment of FIG. 2.

As shown in FIGS. 2, 3, and 4, one embodiment of the present invention 18 includes an outer portion 20 and an inner portion 22. As depicted in these figures, the outer 20 and inner 22 portions are round thin circular plates, but the outer 20 and inner 22 portions can easily be reconfigured in different geometric shapes without deviating from the scope of the invention. The outer portion 20 has a plurality of first apertures 24 and the inner portion 22 has a plurality of second 26 apertures. Each first aperture 24 is generally coaxially aligned with a corresponding second aperture 26.

In one embodiment, the plurality of arms 16 are secured onto the inner portion 22 with each arm 16 extending through a corresponding second aperture 26 and then through a corresponding first aperture 24. After passing through the first aperture 24 each arm may also extend through a bracket 25 mounted on the outer portion 20. The arms have a first end 30 which is adapted to be secured onto the inner portion 22, and a second end 32 which is adapted to secure to a tire chain. The arms 16 are comprised of a braided wire cable, but other forms of cable, wire, or rope can be readily substituted. An attachment means for coupling the arms to a tire chain is coupled to the second end of each arm 16. The attachment means shown in this embodiment is a hook 34; however, other forms of attachment means such as clasps, interlocking loops, and other forms of disconnectable attachment means may be utilized. It is also contemplated that the present invention 18 utilize a more permanent attachment means to attach the arm to the tire chain; thus making the present invention 18 integral to the tire chain. This more permanent attachment means may include welding or soldering the second end 32 to the tire chain.

In one embodiment, the inner portion 22 includes an inner surface 40 wherein a plurality of clamping mechanisms 42 are located. Each clamping mechanism 42 is generally located adjacent to a second aperture 26. Each arm 16 extends through the clamping mechanism 42 and then through the second and first apertures, respectively. As shown in FIGS. 2 and 4, a screw-clamp is used as the clamping mechanism 42. The screw-clamp includes a threaded screw 43 engaging a body 44 through which the arm 16 passes. In this configuration, the length of each arm 16 can be varied relative to the dimension of the tire by clamping only a desired portion of the arm 16. Other forms of adjustably attaching the arm to the inner portion can also be utilized. The present invention is also easily configured to have a fixed connection wherein the arm is secured to the inner portion 22 and the length of each arm 16 is not adjustable.

In one embodiment, a bar/rod 50 couples the outer portion 20 and the inner portion 22. The distance between the outer 20 and inner 22 portions partially determines the tension in each arm 16. The greater the distance in between the outer 20 and inner 22 portions, the greater the tension in each arm 16. The bar 50 provides a means for increasing or decreasing this distance.

As shown in FIG. 1, in one embodiment, the outer portion 20 is configured to remain in place relative to the bar 50 and the inner portion 22 moves axially along the bar 50. As shown in FIG. 2, a pair of nuts 51 may be secured together on each side of the outer portion 20, mounted on the rod 50, to fix the outer portion 20 in position relative to a handle 52; the handle 52 is free to rotate without rotating the outer portion 20. A nut 53 may also be mounted on the bar 50 near inner portion 22. A threaded connection between the inner portion 22 and the bar 50 enables the inner portion 22 to travel axially outward and inward along the bar 50 depending upon the rotational direction of the bar 50. A handle 52 is provided at the proximal end 56 of the bar 50 in order to enable easier rotation of the bar 50. A stop 54 is attached to the distal end 58 of the bar 50 in order to locate the present invention on the tire.

Other mechanisms for varying the distance between the outer 20 and inner 22 portions have been contemplated and fall well within the scope of the present invention. A telescopic rod, a bar having a plurality of locking points for either the outer or inner portion, or an arrangement wherein the outer or inner portion is variably positionable relative to a rod are just some of the embodiments which have also been contemplated.

As shown in FIGS. 1 and 2, in one embodiment, the present invention is positioned in the center of the tire 12 and the arms 16 are attached to the tire chain 10. Gross adjustment of the arm's 16 length can be achieved by releasing the arm 16 from the clamping mechanism 42 located on the inner portion 22 and increasing or decreasing the length of the arm. The arm is then reclamped into the clamping mechanism 42 after the desired arm length is achieved. Tightening or loosening of tension in the arms 16 is achieved by rotating the handle 52, which causes the inner portion 22 to travel axially outward or axially inward along the bar 50 depending upon the rotational direction. With one end of each arm secured to the inner portion, an increase in the distance between the outer 20 and inner 22 portions pulls the second end of the arm. This creates tension in the arm and correspondingly creates greater tension in the tire chain. The tire chain is loosened by simply decreasing the distance between the outer 20 and inner 22 portions.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

I claim:

1. A tire chain tightening apparatus comprising:
an inner plate comprising a plurality of clamping mechanisms;
an outer plate coupled to the inner plate so that a distance between the outer and the inner plates is selectively adjustable; and
a plurality of arms extending through the outer plate, each arm having a first free end, and a second end adaptable to connect to a tire chain, each arm being secured away from said first free end to said inner plate by one of said plurality of clamping mechanisms to define a portion extending from said inner plate to said first free end, with said extending portion being adjustable to adjust a length of the arm between said one of the plurality of clamping mechanisms and said second end to accommodate a range of tire sizes.

2. The apparatus of claim 1, wherein the inner and the outer plates are coaxially coupled by a threaded rod.

3. The apparatus of claim 2, wherein the rod includes a handle for rotating the rod.

4. The apparatus of claim 2, wherein the rod includes a grip for rotating the rod.

5. The apparatus of claim 1, wherein the outer plate is a relatively thin circular plate having a plurality of apertures extending therethrough.

6. The apparatus of claim 1, wherein each arm is comprised of a braided metal wire and a hook.

7. The apparatus of claim 1, wherein the plurality of arms are arranged circumferentially around the inner plate.

8. The apparatus of claim 1, wherein each clamping mechanism comprises a screw-clamp.

9. An apparatus for providing added traction to a tire comprising:
a tire chain;
an inner plate comprising a plurality of clamping mechanisms;
an outer plate coupled to the inner plate so that a distance between the outer and the inner plates is selectively adjustable; and
a plurality of arms extending through the outer plate,
wherein each arm has a first free end, and a second end of each arm is coupled to the tire chain, each arm being secured away from said first free end to said inner plate by one of said plurality of clamping mechanisms to define a portion extending from said inner plate to said first free end, with said extending portion being adjustable to adjust a length of the arm between said one of the plurality of clamping mechanisms and said first end to accommodate a range of tire sizes.

10. The apparatus of claim 9, wherein the inner and the outer plates are coaxially coupled by a threaded rod.

11. The apparatus of claim 10, wherein the rod includes a grip for rotating the rod.

12. The apparatus of claim 10, wherein the rod includes a handle for rotating the rod.

13. The apparatus of claim 9, wherein the outer plate is a relatively thin circular plate having a plurality of apertures extending therethrough.

14. The apparatus of claim 9, wherein each arm is comprised of a braided metal wire and a nook.

15. The apparatus of claim 9, wherein the plurality of arms are arranged circumferentially around the inner plate.

16. The apparatus of claim 9, wherein each clamping mechanism comprises a screw-clamp.

* * * * *

UNITED STATES PATENT AND TRADEMARK OFFICE
CERTIFICATE OF CORRECTION

PATENT NO. : 7,677,285 B2  Page 1 of 1
APPLICATION NO. : 11/340894
DATED : March 16, 2010
INVENTOR(S) : Lynn It is certified that error appears in the above-identified patent and that said Letters Patent is hereby corrected as shown below:

At column 5, claim 9, line 10, replace "second end of" with --second end-- therefor.

At column 5, claim 9, line 11, delete "each arm is".

At column 5, claim 9, line 17, replace "first end" with --second end-- therefor.

Signed and Sealed this

Thirteenth Day of July, 2010

David J. Kappos
*Director of the United States Patent and Trademark Office*